(12) United States Patent
Kubo (10) Patent No.: US 6,345,154 B1
(45) Date of Patent: *Feb. 5, 2002

(54) INTERCHANGEABLE LENS

(75) Inventor: Hiroaki Kubo, Mukou (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/442,482

(22) Filed: Nov. 18, 1999

(30) Foreign Application Priority Data

Nov. 18, 1998 (JP) .............................. 10-328007

(51) Int. Cl.⁷ .............................................. G03B 13/00
(52) U.S. Cl. ........................ 396/133; 396/529; 396/532; 396/508
(58) Field of Search .............................. 396/52, 53, 54, 396/55, 71, 79, 529, 530, 531, 532, 533, 131, 137, 133, 508

(56) References Cited

U.S. PATENT DOCUMENTS

| | | | | | |
|---|---|---|---|---|---|
| 4,647,171 | A | * | 3/1987 | Yamaki | 396/298 |
| 5,065,175 | A | * | 11/1991 | Suzuki et al. | 396/81 |
| 5,434,637 | A | * | 7/1995 | Ohta | 396/529 |
| 5,557,365 | A | | 9/1996 | Ohsawa | 369/279 |
| 6,029,009 | A | * | 2/2000 | Imura | 396/55 |
| 6,112,027 | A | * | 8/2000 | Sekine et al. | 396/52 |

* cited by examiner

Primary Examiner—David M. Gray
(74) Attorney, Agent, or Firm—Burns, Doane, Swecker & Mathis, LLP (57) ABSTRACT

A lens to be interchangeably attached to a camera body includes a first actuator which is appropriately used for a first camera body to which the lens is to be attached, and a second actuator which is appropriately used for a second camera body to which said lens is to be attached.

38 Claims, 3 Drawing Sheets

INTERCHANGEABLE LENS

The present invention claims a priority based on the Japanese Patent Application No. H10-328007, the contents of which is incorporated hereinto by reference in its entirety.

BACKGROUND OF THE INVENTION

1. Field of the Invention

This invention relates to an interchangeable image taking lens for use in a camera such as a digital camera, a silver halide camera and a video camera.

2. Description of the Related Art

A digital camera equipped with an interchangeable image taking lens unit is known. As an interchangeable image taking lens for a digital camera, an existing interchangeable lens for a silver halide camera is normally used. In this specification, for the sake of convenience, a camera for taking an image by a silver halide film is referred to as a silver halide camera.

However, a digital camera is different from a silver halide camera in a focus detection system for an automatic focusing (hereinafter referred to as "AZ") control and a photometry system for an automatic exposure (hereinafter referred to as "AE") control.

In addition, although a digital camera employs a contrast detection system among TTL systems (Through The Lens systems), a silver halide camera usually employs a phase difference detecting system equipped with line sensors. The aforementioned contrast detection system employed by a digital camera is quite different from the phase difference detecting system employed by a silver halide camera in characteristic. Furthermore, a digital camera is required to deal with a moving image taking which is not required by a silver halide camera.

Therefore, with respect to an actuator for driving a lens unit and/or parts of a taking lens such as an aperture diaphragm, a digital camera requires operation characteristics different from that required by a silver halide camera. As a result, it was practically difficult to take an image at optimum conditions by a digital camera with an interchangeable lens designed for a silver halide camera.

To solve the aforementioned drawbacks, it may be considered to select either an interchangeable lens equipped with an actuator suitable for a digital camera or an interchangeable lens equipped with an actuator suitable for a silver halide camera depending on the camera to be used. However, this requires two kinds of interchangeable lenses, one of which being suitable for a digital camera and the other for a silver halide camera, resulting in inconvenience and uneconomical.

SUMMARY OF THE INVENTION

Therefore, it is an object of the present invention to provide an interchangeable lens which can perform suitable operation for a plurality of camera bodies, and which can be easily handled by a user and can reduce economical expenses of the user.

It is another object of the present invention to provide an interchangeable lens which can perform at optimum operating conditions for a plurality of different types of camera bodies such as a digital camera body and a silver halide camera body.

According to one aspect of the present invention, a lens to be interchangeably attached to a camera body includes a first actuator which is appropriately used for a first camera body to which the interchangeable lens is to be attached, and a second actuator which is appropriately used for a second camera body to which the interchangeable lens is to be attached.

With this interchangeable lens, it is possible to operate the appropriate first or second actuator depending on the first or second camera body to which the interchangeable lens is to be attached. Therefore, a single interchangeable lens can be performed at optimum operating conditions for a camera body to which the interchangeable lens is to be attached. For example, even if the interchangeable lens is selectively attached to one of the different types of digital cameras, it is possible to take an image at optimum conditions depending on the type of digital camera and the like.

According to another aspect of the present invention, a lens to be interchangeably attached to one of a plurality of different types of camera bodies includes a first actuator which is appropriately used for a first type of the camera body to which the interchangeable lens is to be attached, and a second actuator which is appropriately used for a second type of the camera body t o which the interchangeable lens is to be attached.

With this interchangeable lens, it is possible to operate an appropriate first or second actuator depending on the first or second camera body different in type. Therefore, a single interchangeable lens can be used at optimum operating conditions for both digital and silver halide camera bodies.

It is preferable that the interchangeable lens further includes a first electric contact to which an electric contact of the first camera body is to be electrically connected, and a second electric contact to which an electric contact of the second camera body is to be electrically connected, whereby the first or second actuator to be activated is selected depending on which of the first and second electric contacts is electrically connected to the electric contact of the first or second camera body.

According to this structure, since an actuator appropriate to the first or second type of the camera body is automatically selected by simply attaching the interchangeable lens to the first or second type of the camera body, the operability can be improved.

It is also preferable that the interchangeable lens further includes a switching mechanism for switching a first connected state in which the first actuator is connected to a driving member to be driven to a second connected state in which the second actuator is connected to the driving member, and vice versa.

If the first and second actuators are always connected to the driving member, when the selected actuator drives the driving member, the driving member reversely drives the non-selected actuator. Therefore, the selected actuator is required to have large driving force. However, by switching the connection of the driving member and the first or second first actuator depending on the type of the camera body, such an inconvenience that the driving member reversely drives the non-selected actuator is canceled. As a result, each actuator is not required to have large driving power.

BRIEF DESCRIPTION OF THE DRAWINGS

The above and other objects, features, and advantages of the present invention will be apparent from the following detailed description of the preferred embodiments with reference to the attached drawings, wherein.

DETAILED DESCRIPTION OF THE PREFERRED EMBODIMENTS

Figure 1:
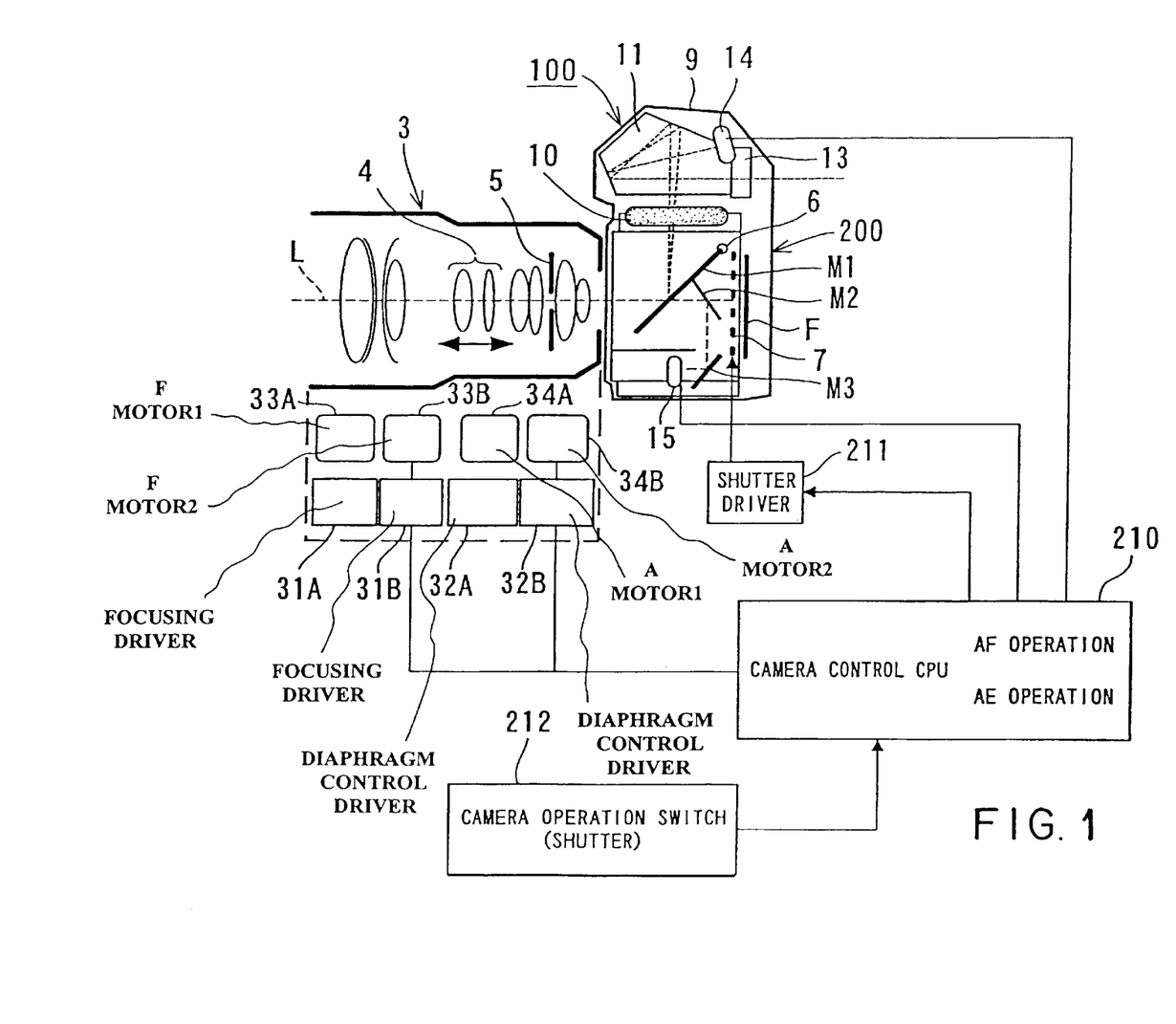
FIG. 1 is a block diagram showing the construction or a silver halide camera to which an interchangeable lens which is an embodiment of the present invention is attached.
Figure 2:
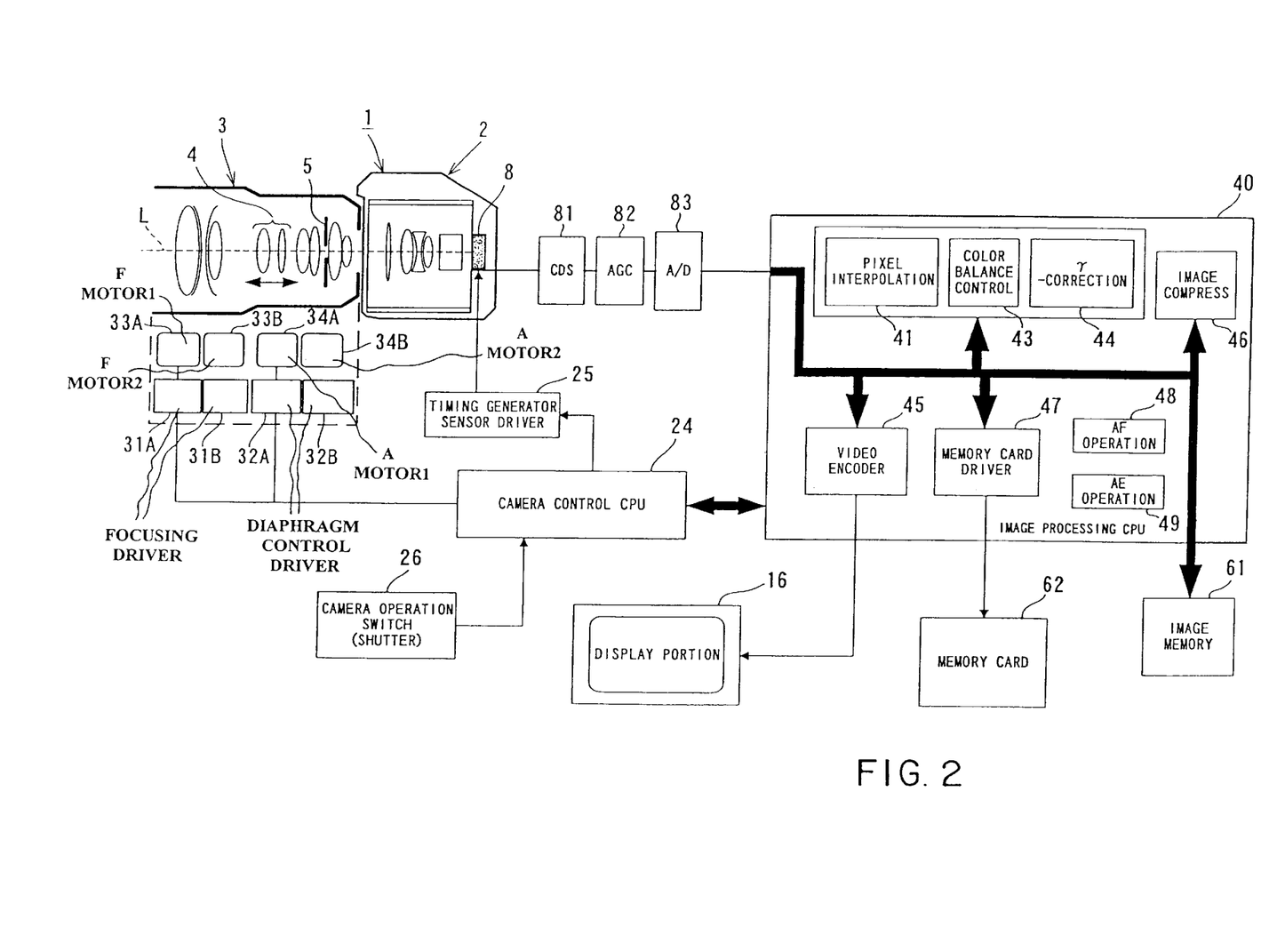
FIG. 2 is a block diagram showing the construction of a digital camera to which the interchangeable lens of the embodiment is attached.

FIG. 1 is a block diagram showing the construction of a silver halide camera to which an interchangeable lens which is an embodiment of the present invention is attached. FIG. 2 is a block diagram showing the construction of a digital camera to which the interchangeable lens of the embodiment of the present invention is attached.

In FIGS. 1 and 2, the reference numeral 3 denotes an interchangeable image taking lens. This interchangeable lens 3 is provided with a plurality of lens units including a focus lens unit 4. The interchangeable lens 3 is provided with a mount which can be used for a plural types of cameras such as a camera body 200 of the silver halide camera 100 as shown in FIG. 1 and the camera body 2 of the digital camera 1 as shown in FIG. 2. The interchangeable lens 3 is also provided with a plurality of driving motors for driving the focus lens unit 4 and aperture diaphragm 5 so as to exhibit a full performance of every one of cameras bodies.

In detail, the aforementioned interchangeable lens 3 is provided with the first to fourth actuators each appropriate for the different types of camera bodies 2, 200 for driving lens parts (driving members to be driven). The actuators include two focusing motors (denoted as "F motor" in FIGS. 1 and 2) and two aperture motors (denoted as "A motor" in FIGS. 1 and 2). Furthermore, the interchangeable lens 3 is provided with focusing drivers 31A, 31B and diaphragm control drivers 32A, 32B each for driving the aforementioned motors.

In FIGS. 1 and 2, the focusing driver 31A, diaphragm control driver 32A, focusing motor 33A and aperture motor 34A correspond to the camera body 2 of the digital camera 1, respectively. The focusing driver 31B, diaphragm control driver 32B, focusing motor 33B and aperture motor 34B correspond to the camera body 200 of the silver halide camera 100, respectively. The focusing motors 33A, 33B drive the focus lens unit 4, and the aperture motors 34A, 34B drive the aperture diaphragm 5.

The structure of the mount of the interchangeable lens 3 will be explained with reference to FIGS. 3A to 3D.

Figure 3A:
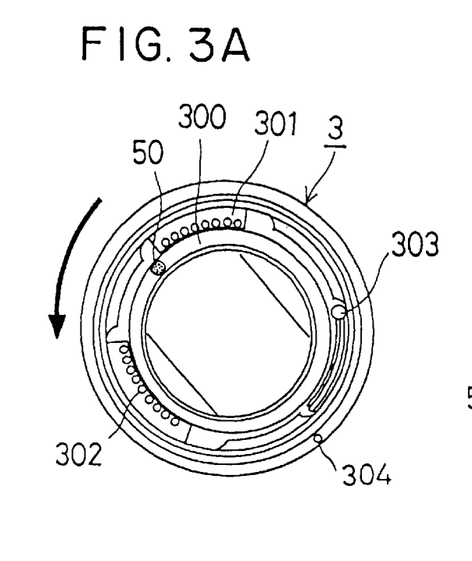
FIGS. 3A and 3B illustrate a mount of the interchangeable lens as seen from a front of the camera.
Figure 3B:
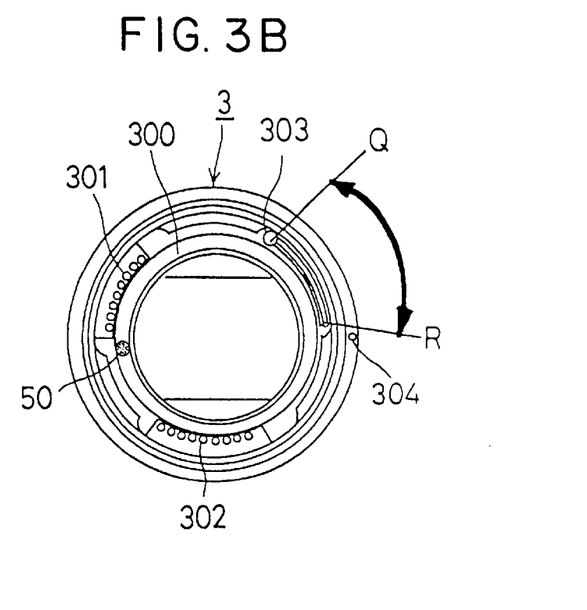
Figure 3C:
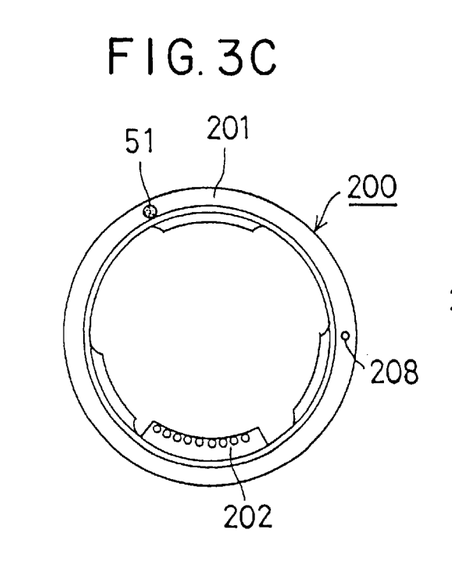
FIGS. 3C and 3D illustrate a mount of a camera body of the silver halide camera and that of the digital camera, respectively.
Figure 3D:
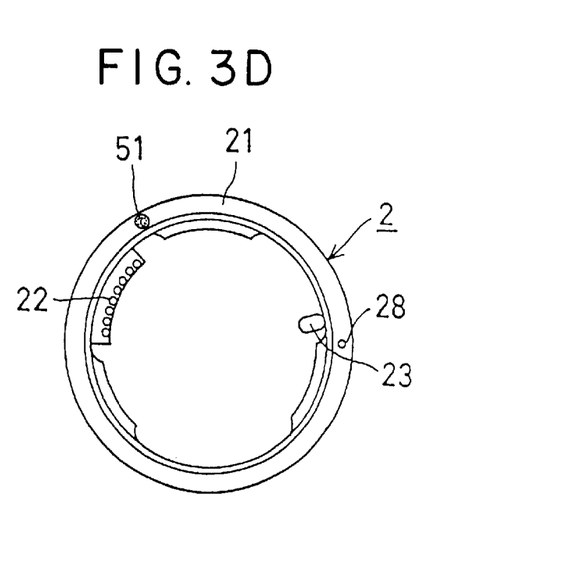

FIGS. 3A and 3B illustrate a mount of the interchangeable lens as seen from a front of the camera, and FIGS. 3C and 3D illustrate a mount of a camera body of the silver halide camera and that of the digital camera, respectively.

The mount 300 of the interchangeable lens 3 has a colored (e.g., black-colored) positioning mark 50. The mount 300 of the interchangeable lens 3 is attached to a mount 201 of the silver halide camera body 200 or a mount 21 of the digital camera body 2 in a state that the positioning mark 50 coincides with a positioning mark 51 formed on the mount 201 or 21, as shown in FIG. 3A. In this state, by rotating the interchangeable lens 3 by 45 degrees in the direction of the arrow shown in FIG. 3A, a locking pin 208 or 28 formed on each camera body is engaged with a locking aperture 304 formed in the interchangeable lens 3, and the interchangeable lens 3 is attached to the silver halide camera body 200 or digital camera body 2 at the position shown in FIG. 3B.

The interchangeable lens 3 is provided with two groups of electric contacts 301, 302 along the circumference thereof at a certain rotational angle. The first group of the electric contacts 301 is used for operating the focusing motor 33A and aperture motor 34A of the digital camera. The second group of the electric contacts 302 is used for operating the focusing motor 33B and aperture motor 34B of the silver halide camera.

As shown in FIG. 3B, the interchangeable lens 3 is provided with a switching lever 303. The lever 303 can be rotated between the silver halide camera attaching position Q (the same as the non-attaching position to the camera body) and the digital camera attaching position R. The switching lever 303 is used to change a first engaging state in which the focusing motor 33A and aperture motor 34A for the digital camera are engaged with the focus lens unit 4 and aperture diaphragm 5, respectively, to a second engaging state in which the focusing motor 33B and aperture motor 34B for the silver halide camera are engaged with the focus lens unit 4 and aperture diaphragm 5, respectively, and vice versa.

In a state that the interchangeable lens 3 is attached, when the switch lever 303 is positioned at the silver halide camera attaching position Q, the switching lever 303 is inserted between driving connection members comprising two gears which connect the focusing motor 33A for the digital camera and the focus lens unit 4 and between driving connection members comprising two gears which connect the aperture motor 34A for the digital camera and the aperture diaphragm 5 so as to disengage the two gears. As a result, the engagements between the motor 33A and the focus lens unit 4 and between the motor 34A and the aperture diaphragm 5 are disengaged.

To the contrary, in a state that the interchangeable lens 3 is attached, when the switch lever 303 is positioned at the digital camera attaching position R, the switching lever 303 is inserted between driving connection members comprising two gears which connect the focusing motor 33B for the silver halide camera and the focus lens unit 4 and between driving connection members comprising two gears which connect the aperture motor 34B for the silver halide camera and the aperture diaphragm 5 to disengage the two gears. As a result, the engagements between the motor 33B and the focus lens unit 4 and between the motor 34B and the aperture diaphragm 5 are disengaged.

As shown in FIG. 3C, the mount 201 of the camera body 200 of the silver halide camera 100 is provided with electric contacts 202 to be electrically connected to the silver halide camera electric contacts 302 of the interchangeable lens 3 in an attached state of the interchangeable lens 3. These electric contacts 302, 202 enables a control of the focusing motor 33B and aperture motor 34B for the silver halide camera from the camera body side of the silver halide camera 100.

In a state that the interchangeable lens 3 is attached to the camera body 200 of the silver halide camera 100, the switching lever 303 is rotated together with the interchangeable lens 3, and is positioned at the original position (Q) as shown in FIG. 3B. Therefore, as mentioned above, the focusing motor 33A and aperture motor 34A for the digital camera are disengaged from the focus lens unit 4 and aperture diaphragm 5, respectively, and only the focusing motor 33B and aperture motor 34B are engaged with the focus lens unit 4 and aperture diaphragm 5, respectively.

As shown in FIG. 3D, the mount 21 of the camera body 2 of the digital camera 1 is provided with electric contacts 22 to be electrically connected to the digital camera electric contacts 301 of the interchangeable lens 3 in an attached state of the interchangeable lens 3. These electric contacts 301, 22 enables a control of the focusing motor 33A and aperture motor 34A for the digital camera from the camera body 2 side of the digital camera 1.

Furthermore, the mount 21 of the digital camera 1 is provided with a protruded engagement switching pin 23. The pin 23 is engaged with the switching lever 303 during the positioning operation of the interchangeable lens 3 to prevent the further rotation of the switching lever 303 in accordance with the rotating operation of the interchangeable lens 3. Thus, the switching lever 303 is held stationary, and is moved to the position R relative to the inerchangeable lens 3. As a result, the focusing motor 33B and aperture motor 34B for the silver halide camera are disengaged from the focus lens unit 4 and aperture diaphragm 5, respectively, and only the focusing motor 33A and aperture motor 34A are engaged with the focus lens unit 4 and aperture diaphragm 5, respectively.

Thus, the cooperating of the engagement switching pin 23 and switching lever 303 automatically switches the engaged state in which the focusing motor and aperture motor are engaged with the focus lens unit 4 and aperture diaphragm 5, respectively, to the disengaged state in which the focusing motor and aperture motor are disengaged from the focus lens unit 4 and aperture diaphragm 5, respectively, and vice versa. The reason that one of the focusing motors and one of the aperture motors are engaged with the focus lens unit 4 and aperture diaphragm 5, respectively, and the other of the focusing motors and the other of the aperture motors are not engaged with the focus lens unit 4 and aperture diaphragm 5, respectively, is as follows.

If all of the focusing motors and aperture motors are always is engaged with the focus lens unit 4 and aperture diaphragm 5, when the selected focusing motor or aperture motor drives the focus lens unit 4 or aperture diaphragm 5, the selected focusing motor or aperture motor is required larger driving force because the focus lens unit 4 or aperture diaphragm 5 reversely drives the non-selected focusing motor or aperture motor. Therefore, by engaging only the selected motor is engaged with the focus lens unit 4 or aperture diaphragm 5 depending on the type of the camera body, the focus lens unit 4 and aperture diaphragm 5 does not reversely drive the non-selected motor. This requires smaller driving force of the focusing motor and aperture motor.

Next, the silver halide camera 1 equipped with the above-mentioned interchangeable lens 3 as shown in FIG. 1, will be explained.

Behind the lens units on the optical path, a quick return mirror M1 is provided in a camera body 200. The mirror Ml is pivoted at its upper portion by a pivot shaft 6. Provided behind the quick return mirror M1 along the optical path is a focal plane shutter 7. At a lens back position behind the shutter 7, a silver halide film F is loaded.

Above the quick return mirror M1, an optical finder unit 9 is provided in the camera body 200. In the optical finder unit 9, a pentagonal roof prism 11 is disposed by way of a focusing screen 10. An ocular 13 is equipped behind the prism 11 and a light amount sensor 14 is disposed above the ocular 13.

The quick return mirror M1 keeps its original position as shown in rig. 1, i.e., the slanted position, until a shutter release button (not shown) is depressed, and directs the optical path L from the interchangeable lens 3 toward the focusing screen 10. When the shutter release button is depressed, the quick return mirror NM rotates up to the lower position of the focusing screen 10 to open the optical path L toward the silver halide film F.

The quick return mirror M1 is provided with a mirror M2 rotatably attached to its rear surface. The mirror M2 and a fixed mirror M3 disposed below the mirror M2 direct an optical image passed through a half mirror portion partially formed in the quick return mirror M1 toward a focus detecting sensor 15.

The prism 11 reverses and reduces the optical image, i.e., mirror image, focused on the focusing screen 10, and then transmits the reversed and reduced optical image to the light amount sensor 14 and ocular 13.

Based on the light amount data obtained by the light amount sensor 14, an aperture of the aperture diaphragm 5 and shutter speed are determined. Furthermore, based on the data obtained by the focus detecting sensor 15, focusing state is controlled. These light measuring and focus detection are performed in a state that the aperture diaphragm 5 is in a full opened state.

The camera control CPU 210 controls each component of the camera body 200 and interchangeable lens 3. In detail, the CPU 210 controls the focal plane shutter 7 by way of the shutter driver 211, and also controls an actuator (not shown) of the quick return mirror M1. Furthermore, the CPU 210 controls the focusing motor 33B or aperture motor 34B by way of a focusing driver 31B or diaphragm control driver 32B.

Connected to the camera control CPU 210 is a camera operation switch 212 including a switch operated with the shutter release button and a power switch.

Next, the operation of the silver halide camera 100 in which the aforementioned interchangeable lens 3 is connected to the camera body 200, will be explained.

When the interchangeable lens 3 is connected to the camera body 200 as shown in FIG. 3B, the electric contacts 302 at the lens side 3 and electric contacts 202 of the camera body side 200 automatically coincide to electrically be connected each other. In other words, the focusing driver 31B and focusing motor 33B each built in the interchangeable lens 3 are selected, and the diaphragm control driver 32B and aperture motor 34B each built in the interchangeable lens 3 are selected.

The switching lever 303 of the interchangeable lens 3 is located at the position Q as shown in FIG. 3B, disconnects the driving transmitting path from the focusing motor 33A for the digital camera to the focus lens unit 4 and the driving transmitting path from the aperture motor 34A for the digital camera to the aperture diaphragm 5. Thus, only the driving transmitting paths from the focusing motor 33B for the silver halide camera to the focus lens unit 4 and the driving transmitting path from the aperture motor 34B for the silver halide camera to the aperture diaphragm 5 are connected.

As is apparent from the above, if the user has one type of interchangeable lens 3, an appropriate combination of the camera body 200 of the silver halide camera 100 and the actuators built in the interchangeable lens 3 can be automatically obtained without causing troublesome operations.

Prior to an image taking, the aperture diaphragm 5 is in an opened state. The optical image passes through the lens units and aperture diaphragm 5 is changed its optical path L upwardly by the quick return mirror M1 in the camera body 200 to be focused on the focusing screen 10. Thereafter, the optical image is reversed and reduced by the pentagonal roof prism 11 and introduced to the light amount sensor 14. The optical image reaches the ocular 13 through the prism 11. Thus, the user can recognize the finder image by looking into the ocular 13 to confirm the flaming.

The light amount sensor 14 detects the light amount. Based on the light amount data, the camera control CPU 210 calculates the exposure data including control amount of the aperture diaphragm 5.

On the other hand, some of the light passed through the image taking lens 4 and aperture diaphragm 5 is introduced to the focus detecting sensor 15 by way of the mirror M2 behind the quick return mirror M1 and the fixed mirror M3. The sensor 15 outputs defocus data. Based on the data, the camera control CPU 210 calculates control amount of the focus lens unit 4 to dissolve the defocus.

When the shutter release button is half depressed, the focus lens unit 4 and aperture diaphragm 5 is driven at high speed by the focusing motor 33B and aperture motor 34B based on the above-calculated control amount. At the same time, the quick return mirror M1 and the mirror MS are upwardly rotated. In this state, the camera control CPU 210 opens and closes the focal plane shutter 7 at a certain shutter speed by way of shutter driver 211. Then, the optical image passed through the lens units and aperture diaphragm 5 is focused on and recorded by the silver halide film F without being interrupted by the quick return mirror M. Thereafter, the quick return mirror M1 and mirror M2 return to the original position.

As mentioned above, in the silver halide camera, since the light amount measuring by the light amount sensor 14 and the focus detection by the focus detecting sensor 15 are performed in a state that the aperture of the diaphragm is opened, the driving of the focus lens unit 4 and aperture diaphragm 5 toward the calculated control amount is required to be quickly driven at the same time when the shutter release button is depressed. As for the aperture diaphragm 5 after the exposure, the diaphragm is required to be quickly returned to its original fully opened position. Therefore, as the focus motor 33B and aperture motor 34B, a DC motor which outputs high torque regardless of small size is used.

Next, the digital camera equipped with the aforementioned interchangeable lens 3 as shown in FIG. 2 will be explained. In FIG. 2, the same reference numeral is allotted to the same or corresponding portion in FIG. 1.

In FIG. 2, the reference numeral 2 denotes a camera body, and the reference numeral 8 image pick-up sensor. As the image pick-up sensor 8, a CCD (Charged Coupled Device) may be used. The camera body 2 is provided with a display portion 16 which consists of a liquid crystal display (LCD), for example.

The camera control CPU 24 controls each component or the camera body 2 and interchangeable lens 3. The CPU 24 controls the focusing motor 33A and aperture motor 34A based on the data exchanged between the CPU and the below mentioned image processing portion, and further controls the image pick-up sensor 8 via the timing generator (sensor driver) 25.

Also connected to the camera control CPU 24 is a camera operation switch 26 which includes a switch operated by the shutter start button or a power switch.

The image pick-up sensor 8 is an area sensor, on each pixel of which being covered by a primary color transmission filter of R(red), G(green) and B(blue) in a check pattern. The image pickup sensor 8 photoelectrically converts the R, G and B components of the optical image of the object focused by the lens units into the corresponding R, G and B image components, each of which consists of a sequence of pixel signals received by the pixels, and outputs them.

The timing generator 25 generates and outputs driving control signals for the image pick-up sensor 8, based on a reference clock transmitted from the camera control CPU 24. To be more precise, the timing generator 25 generates, for example, a timing signal for determining the start and termination of the integration or exposure, and clock signals, i.e., a horizontal synchronization signal, a vertical synchronization signal, a transfer signal, etc., for controlling the read out timings of the signals from the pixels. These timing signals and clock signals are supplied to the image pick-up sensor 8 by way of a driver (not shown).

The output of the image pick-up sensor 8 is subjected to a signal processing by a CDS (Correlated Double Sampling) circuit 81, which decreases noises of the image signals, and an AGC (Automatic Gain Control) circuit 82, which adjusts the levels of the image signals, and an A/D converter 83. The A/D converter 83 converts the analogue image signals normalized by the AGC circuit 82 into 10-bit digital signals.

The reference numeral 40 denotes an image processing unit for forming an image file by processing an output of the A/D converter 83. The image processing unit 40 is controlled by the camera control CPU 24.

When taking an image, the image data obtained from the image pick-up sensor 8 is transmitted to the image processing unit 40 for subjecting to various processing. The signals inputted into the image processing unit 40 from the A/D converter 83 are written in the image memory 61 in synchronism with the read out of the signals from the image pick-up sensor 8. Thereafter, the process shown in each block is executed while accessing the data written in the image memory 61.

In the image processing unit 40, the reference numeral 41 denotes a pixel interpolation block in which a pixel interpolation is performed at a certain interpolation pattern. According to this embodiment, each pixel of components R, G and B is subjected to a masking processing in accordance with a respective filter pattern. Thereafter, as for the pixel of the component G having high frequency, the intermediate two values among four outputted values of the peripheral four G pixels are converted into an average value by a median filter. As for the components R and B, they are subjected to an average interpolation processing to obtain each output.

The color balance control block 43 individually performs a gain control of each output of R, G and B of the pixel interpolation block 41 to adjust the color balance of the components R, B and G. As for the color balance control, R/G and B/C; is calculated from each component of R, G and B output by the camera control CPU 24 to obtain a correction gain value of R and B.

The gamma correction block 44 performs a nonlinear transformation of each of R, G and B outputs subjected to the color balance processing for a tone transformation appropriate to the display portion 16. The gamma-corrected image data is written in the image memory 61.

The video encoder 45 reads out the above data written in the image memory 61 to encode into NTSC/PAL, and the encoded data is displayed on the display portion 16.

The image compress block 46 reads out the image data of the obtained image from the image memory 61 for subjecting to a compressing processing. After the compression, the compressed image is stored in the memory card 62 via the memory card driver 47.

The memory card 62 is detachably inserted into a certain portion of the camera body 2.

AF operation block 48 calculates a focus control value based on the image data obtained from the image pick-up sensor 8. In detail, in order to obtain the contrast value of the high frequency portion in the image, after interpolating the G signal, a high pass filter processing is performed. As for the AF control, so-called contrast detecting feedback system in which the focus lens unit 4 is driven in a direction that the maximum output signals are obtained, is adapted.

AE operation block 49 calculates an exposure control value based on the image data obtained from the image pick-up sensor 8. In detail, an average value of the luminance component is calculated from the image R,G,B data. As for the AE control, a feedback control in which the aperture diaphragm 5 is driven so that the difference between the average value of the luminance components and the reference value becomes zero, is adapted. The accumulating time is in synchronized with the predetermined read out rate.

Next, the operation of the digital camera 1 in which the aforementioned interchangeable lens 3 is attached to the camera body 2 will be explained.

When the interchangeable lens 3 is connected to the camera body 2 as shown in FIG. 3B, the electric contacts 301 at the lens unit side 3 and electric contacts 22 of the camera body side 2 automatically coincide to be electrically connected each other. In other words, the focusing driver 31A and focusing motor 33A each built in the interchangeable lens 3 are selected, and the diaphragm control driver 32A and aperture motor 34A each built in the interchangeable lens 3 are selected.

At the same true, the switching pin 23 formed on the mount 21 of the digital camera 1 is engaged with the switching lever 303 of the interchangeable lens 3, and the lever is kept at its position R. As a result, the driving transmitting path from the focusing motor 33B for the silver halide camera to the focus lens unit 4 and the driving transmitting path from the aperture motor 34B for the silver halide camera to the aperture diaphragm 5 are disconnected. Only the driving transmitting paths from the focusing motor 33A for the digital camera to the focus lens unit 4 and the driving transmitting path from the aperture motor 34A for the digital camera to the aperture diaphragm 5 are connected.

When the shutter start button is half depressed, the optical image passed through the lens units and aperture diaphragm 5 is focused on the image pick-up sensor 8. The focused image is photoelectrically converted into electrical signals by the image pick-up sensor 8. The photoelectrically converted signal is outputted though a buffer, and is subjected to a certain signal processing by the CDS circuit 81, the AGC circuit 82 and the A/D converter 83. The processed image data is then inputted into the image processing unit 40, and is also written in the image memory 61.

At the image processing unit 40, the image data written in the image memory 61 is subjected to the pixel interpolation processing, the color balance control, and the gamma correction processing at the pixel interpolation block 41, the color balance control block 43 and the gamma correction block 44, respectively. The processed image data is again written in the image memory 61.

The processed image is read out from the image memory 61 to be encoded into NTSC/PAL by the video encoder 45. Thereafter, the encoded image is displayed as a preview image on the display portion 16. Since this operation is repeated at a predetermined flame cycle, the image displayed on the display portion 16 is updated at the flame cycle to become a moving image rate.

At the AE operation block 49, an average value of the luminance component is calculated based on the above image data. Then, the camera control CPU 24 performs the AE control so that the difference between the calculated value and the reference value becomes zero. In other words, the CPU 24 drives the aperture diaphragm 5 by way of the diaphragm control driver 32A and the aperture motor 34A to determine an aperture or opening of the aperture diaphragm.

At the AF operation block 48, in order to obtain the contrast value of the high frequency portion in the image, after interpolating the G signal, a high pass filter processing is performed. The camera control CPU 24 drives the focus lens unit 4 by way of the focusing driver 31A and focusing motor 33A in a direction that the maximum output signals are obtained.

When the shutter start button is fully depressed, the AF operation is stopped to fix the focused state. Furthermore, both the shutter speed and the aperture of the aperture diaphragm are controlled by referring a look up table from the present illumination value obtained by the AE operation. The shutter speed is controlled by the timing generator (sensor drive) 25 for the image pick-up sensor 8.

The optical image passes through the lens units 9 and aperture diaphragm 5 is focused on the image pick-up sensor 8 as it is. The focused image is photoelectrically converted into electrical signals by the image pick-up sensor 8. The photoelectrically converted signal is outputted though a buffer, and is subjected to a certain signal processing by the CDS circuit 81, the AGC circuit 82 and the A/D converter 83. The processed image data is then inputted into the image processing unit 40, and is also written in the image memory 61.

At the image processing unit 40, the image data written in the image memory 61 is subjected to the pixel interpolation processing, the color balance control, and the gamma correction processing at the pixel interpolation block 41, the color balance control block 43 and the gamma correction block 44, respectively. The processed image data is again written in the image memory 61. The processed image is read out from the image memory 61 to be displayed as a taken image on the display portion 16. At the same time, the image data is compressed at the image compress block 46, and then stored in the memory card 62 via the memory card driver 47.

As explained above, in the digital camera 1, so-called feedback control in which the AE, AF operation is performed based on the image data obtained by the image pick-up sensor 8. Therefore, the focus lens unit 4 and aperture diaphragm 5 are required to be driven in both directions at small steps. Furthermore, at the preview mode, since the image is updated at the moving image rate, a continuous response is also required. Therefore, as the focusing motor 33A and aperture motor 34A, a pulse motor which can finely and continuously control the driving amount of the focus lens unit 4 or aperture diaphragm 5, is used.

In the aforementioned embodiment, the focus lens unit 4 and aperture diaphragm 5 are exemplified as driving members driven by actuators. However, one of the lens unit and aperture diaphragm may be a driving member driven by an actuator. Furthermore, in the embodiment, two types of actuators appropriate to each body of the silver halide camera and digital camera are exemplified. However, two or three types of actuators appropriate to different types of digital cameras may be provided. In the embodiment, an interchangeable lens to be attached to the silver halide camera and digital camera are exemplified. However, the interchangeable lens may be attached to a video camera.

According to the interchangeable lens of the above-mentioned embodiment, it is possible to operate an appropriate lens driving actuator depending on the camera body to which the lens is to be attached. Therefore, a single interchangeable lens can be performed at optimum operating conditions for a camera body to which the lens is to be attached. For example, the user can take a digital camera photograph and a silver halide camera photograph at optimum conditions by using a single interchangeable lens, resulting in a convenient and economical interchangeable lens.

Furthermore, in cases where the actuator to be driven is switched by switching the electric contacts formed on the mount of the camera body depending on the type of the camera body to which the interchangeable lens is attached, the actuator appropriate to the camera body is automatically selected by simply attaching the interchangeable lens to the camera body. Therefore, it is not required for the user to change the actuator, resulting in enhanced operability.

In cases where the engagement of the lens parts and the actuator is changed depending on the type of the camera body to which the interchangeable lens is attached, it is possible to prevent a reverse driving of the non-selected actuator, resulting in a reduced driving force of the actuator.

In the aforementioned embodiment, focusing motors and aperture motors are provided to the interchangeable lens so that the interchangeable lens can be used for all types of cameras to which the interchangeable lens is to be attached. However, for example, in cases where a camera system includes a camera having no automatic focusing function, the interchangeable lens according to the present invention may not be provided with a focusing motor.

The terms and descriptions in this specification are used only for explanatory purposes and the present invention is not limited to these terms and descriptions. It should be appreciated that there are many modifications and substitutions without departing from the spirit and the scope of the present invention which is defined by the appended claims.

What is claimed is:

1. An image taking lens to be interchangeably attached to a first camera body and to a second camera body which is different from said first camera body in image recording method or in type of camera, said image taking lens comprising:
   a first actuator which is used for the first camera body to which said image taking lens is to be attached; and
   a second actuator which is used for the second camera body to which said image taking lens is to be attached,
   wherein said first and second actuators execute a same function at different camera bodies on which said image taking lens is mounted.

2. The image taking lens as recited in claim 1, wherein said function is a focusing function.

3. The image taking lens as recited in claim 1, wherein said function is a diaphragm control function.

4. The image taking lens as recited in claim 1, further comprising:
   a third actuator which is used for the first camera body to which said image taking lens is to be attached; and
   a fourth actuator which is used for the second camera body to which said image taking lens is to be attached.

5. The image taking lens as recited in claim 4, wherein said third and fourth actuators execute a same function of said image taking lens.

6. The image taking lens as recited in claim 5, wherein said function is a focusing function.

7. The image taking lens as recited in claim 5, wherein said function is a diaphragm control function.

8. The image taking lens as recited in claim 1, further comprising:
   a first electric contact to which an electric contact of the first camera body is to be electrically connected; and
   a second electric contact to which an electric contact of the second camera body is to be electrically connected,
   wherein said first or second actuator to be activated is selected depending on which of said first and second electric contacts is electrically connected to the electric contact of the first or second camera body.

9. The image taking lens as recited in claim 1, further comprising a switching mechanism for switching connection of a member of the image taking lens between said first and second actuators.

10. An image taking lens to be interchangeably attached to one of a plurality of different types of camera bodies which are different from one another in image recording method or in type of camera, said image taking lens comprising:
    a first actuator which is used for a first type of the camera body to which said image taking lens is to be attached; and
    a second actuator which is used for a second type of the camera body to which said image taking lens is to be attached,
    wherein said first and second actuators execute a same function at the first camera body and the second camera body on which said image taking lens is mounted.

11. The image taking lens am recited in claim 10, wherein said function is a focusing function.

12. The image taking lens as recited in claim 10, wherein said function is a diaphragm control function.

13. The image taking lens as recited in claim 10, further comprising:
    a third actuator which is used for the first type of the camera body to which said image taking lens is to be attached; and
    a fourth actuator which is used for the second type of the camera body to which said image taking lens is to be attached.

14. The image taking lens as recited in claim 13, wherein said third and fourth actuators execute a same function of said image taking lens.

15. The image taking lens as recited in claim 14, wherein said function is a focusing function.

16. The image taking lens as recited in claim 14, wherein said function is a diaphragm control function.

17. The image taking lens as recited in claim 10, further comprising:
    a first electric contact to which an electric contact of the first type of the camera body is to be electrically connected; and
    a second electric contact to which an electric contact of the second type of the camera body is to be electrically connected,
    wherein said first or second actuator to be activated is selected depending on which of said first and second electric contacts is electrically connected to the electric contact of the first or second type of the camera body.

18. The image taking lens as recited in claim 10, further comprising a switching mechanism for switching connection of a member of the image taking lens between said first and second actuators.

19. An image taking lens to be interchangeably attached to a first camera body and to a second camera body which is different from said first camera body in image recording method or in type of camera, said image taking lens comprising:
   a first actuator which is used for the first camera body to which said image taking lens is to be attached; and
   a second actuator which is used for the second camera body to which said image taking lens is to be attached,
   wherein said first actuator is used when said image taking lens is mounted on said first camera body, but is not used when said image taking lens is mounted on said second camera body, and
   wherein said second actuator is used when said image taking lens is mounted on said second camera body but is not used when said image taking lens is mounted on said first camera body.

20. The image taking lens as recited in claim 19, wherein said first and second actuators execute a same function of said image taking lens.

21. The image taking lens as recited in claim 20, wherein said function is a focusing function.

22. The image taking lens as recited in claim 20, wherein said function is a diaphragm control function.

23. The image taking lens as recited in claim 19, further comprising:
   a third actuator which is used for the first camera body to which said image taking lens is to be attached; and
   a fourth actuator which is used for the second camera body to which said image taking lens is to be attached.

24. The image taking lens as recited in claim 23, wherein said third and fourth actuators execute a same function of said image taking lens.

25. The image taking lens as recited in claim 24, wherein said function is a focusing function.

26. The image taking lens as recited in claim 24, wherein said function is a diaphragm control function.

27. The image taking lens as recited in claim 19, further comprising:
   a first electric contact to which an electric contact of the first camera body is to be electrically connected; and
   a second electric contact to which an electric contact of the second camera body is to be electrically connected,
   wherein said first or second actuator to be activated is selected depending on which of said first and second electric contacts is electrically connected to the electric contact of the first or second camera body.

28. The image taking lens as recited in claim 19, further comprising a switching mechanism for switching a connection of a member of the image taking lens between said first and second actuators.

29. An image taking lens to be interchangeably attached to one of a plurality of different types of camera bodies which are different from one another in image recording method or in type of camera, said image taking lens comprising:
   a first actuator which is used for a first type of the camera body to which said image taking lens is to be attached; and
   a second actuator which is used for a second type of the camera body to which said image taking lens is to be attached,
   wherein said first actuator is used when said image taking lens is mounted on said first camera body, but is not used when said image taking lens is mounted on said second camera body, and
   wherein said second actuator is used when said image taking lens is mounted on said second camera body, but is not used when said image taking lens is mounted on said first camera body.

30. The image taking lens as recited in claim 29, wherein said first and second actuators execute a same function of said image taking lens.

31. The image taking lens as recited in claim 30, wherein said function is a focusing function.

32. The image taking lens as recited in claim 30, wherein said function is a diaphragm control function.

33. The image taking lens as recited in claim 29, further comprising:
   a third actuator which is used for the first type of the camera body to which said image taking lens is to be attached; and
   a fourth actuator which is used for the second type of the camera body to which said image taking lens is to be attached.

34. The image taking lens as recited in claim 33, wherein said third and fourth actuators execute a same function of said image taking lens.

35. The image taking lens as recited in claim 34, wherein said function is a focusing function.

36. The image taking lens as recited in claim 34, wherein said function is a diaphragm control function.

37. The image taking lens as recited in claim 29, further comprising:
   a first electric contact to which an electric contact of the first type of the camera body is to be electrically connected; and
   a second electric contact to which an electric contact of the second type of the camera body is to be electrically connected,
   wherein said first or second actuator to be activated is selected depending on which of said first and second electric contacts is electrically connected to the electric contact of the first or second type of the camera body.

38. The image taking lens as recited in claim 29, further comprising a switching mechanism for switching connection of a member of the image taking lens between said first and second actuators.

* * * * *